United States Patent
Shelton et al.

(10) Patent No.: US 8,009,790 B2
(45) Date of Patent: Aug. 30, 2011

(54) DEBRIS TRAP

(75) Inventors: Steven Bruce Shelton, Wilmington, NC (US); Gerald Martin Latter, Wilmington, NC (US)

(73) Assignee: Global Nuclear Fuel — Americas, LLC, Wilmington, NC (US)

( * ) Notice: Subject to any disclaimer, the term of this patent is extended or adjusted under 35 U.S.C. 154(b) by 971 days.

(21) Appl. No.: 11/955,780

(22) Filed: Dec. 13, 2007

(65) Prior Publication Data
US 2010/0135451 A1 Jun. 3, 2010

(51) Int. Cl.
*G21C 19/42* (2006.01)
(52) U.S. Cl. .................... 376/313; 376/310
(58) Field of Classification Search ............... 376/313, 376/310
See application file for complete search history.

(56) References Cited

U.S. PATENT DOCUMENTS

| | | | | |
|---|---|---|---|---|
| 3,039,122 | A * | 6/1962 | Birdsall | 15/1.7 |
| 4,005,892 | A * | 2/1977 | Williams | 294/1.4 |
| 4,481,117 | A * | 11/1984 | Collins | 210/776 |
| 5,425,153 | A * | 6/1995 | Vosbikian | 15/257.2 |
| 5,488,634 | A | 1/1996 | Johansson et al. | |
| 5,581,826 | A * | 12/1996 | Edwards | 4/507 |
| 5,661,873 | A * | 9/1997 | Karet | 15/344 |
| 5,702,138 | A * | 12/1997 | Elkind | 294/1.4 |
| 5,727,039 | A | 3/1998 | Harmon et al. | |
| 5,787,140 | A | 7/1998 | Dunlap et al. | |
| 5,809,101 | A | 9/1998 | Dunlap et al. | |
| 6,199,237 | B1 * | 3/2001 | Budden | 15/1.7 |
| 7,404,230 | B1 * | 7/2008 | Phillips | 15/344 |
| 2005/0126969 | A1 * | 6/2005 | Dolton, III | 210/169 |
| 2006/0237978 | A1 * | 10/2006 | Krieger | 294/1.4 |

* cited by examiner

Primary Examiner — Ricardo Palabrica
(74) Attorney, Agent, or Firm — Nixon & Vanderhye P.C.

(57) ABSTRACT

A debris trap catches debris falling through a fuel bundle orifice in a nuclear reactor. The debris trap includes a shaft and a debris capture tray attached to an end of the shaft. The debris capture tray includes a tray cavity sized larger than the fuel bundle orifice.

6 Claims, 3 Drawing Sheets

DEBRIS TRAP

BACKGROUND OF THE INVENTION

The invention relates to equipment for use in a nuclear reactor and, more particularly, to a debris trap for catching debris falling through a fuel bundle orifice in a nuclear reactor.

A typical fuel assembly in a boiling water nuclear reactor includes a lower tie plate, an upper tie plate and a matrix of sealed fuel rods supported between upper and lower tie plates. The fuel rods contain nuclear fuel pellets in sealed containment for supporting a required critical reaction for the generation of steam. A channel surrounds the tie plates and fuel rods.

Periodically, the locations of fuel bundles are changed, and when the bundles are moved, debris can fall from the moving bundle into other bundles. Such debris may affect operation of the reactor and may cause failures, and it is thus desirable to prevent any debris from falling into other bundles.

BRIEF DESCRIPTION OF THE INVENTION

In an exemplary embodiment, a debris trap is provided for catching debris falling through a fuel bundle orifice in a nuclear reactor. The debris trap includes a shaft including a pivot actuator at one end thereof, and a debris capture tray pivotally attached to an opposite end of the shaft. The debris capture tray includes a tray cavity sized larger than the fuel bundle orifice, and the pivot actuator is operable to pivot the debris capture tray between an insertion position and a capture position.

In another exemplary embodiment, the debris trap includes a shaft and a debris capture tray attached to the shaft. The debris capture tray includes a conical tray cavity having a maximum diameter larger than a width of the fuel bundle orifice.

In yet another exemplary embodiment, a method of inserting a debris trap in a fuel bundle includes the steps of lowering the debris trap to a position adjacent a bottom of the fuel bundle; and (b) positioning the debris capture tray under the fuel bundle.

DETAILED DESCRIPTION OF THE INVENTION

Figure 1:
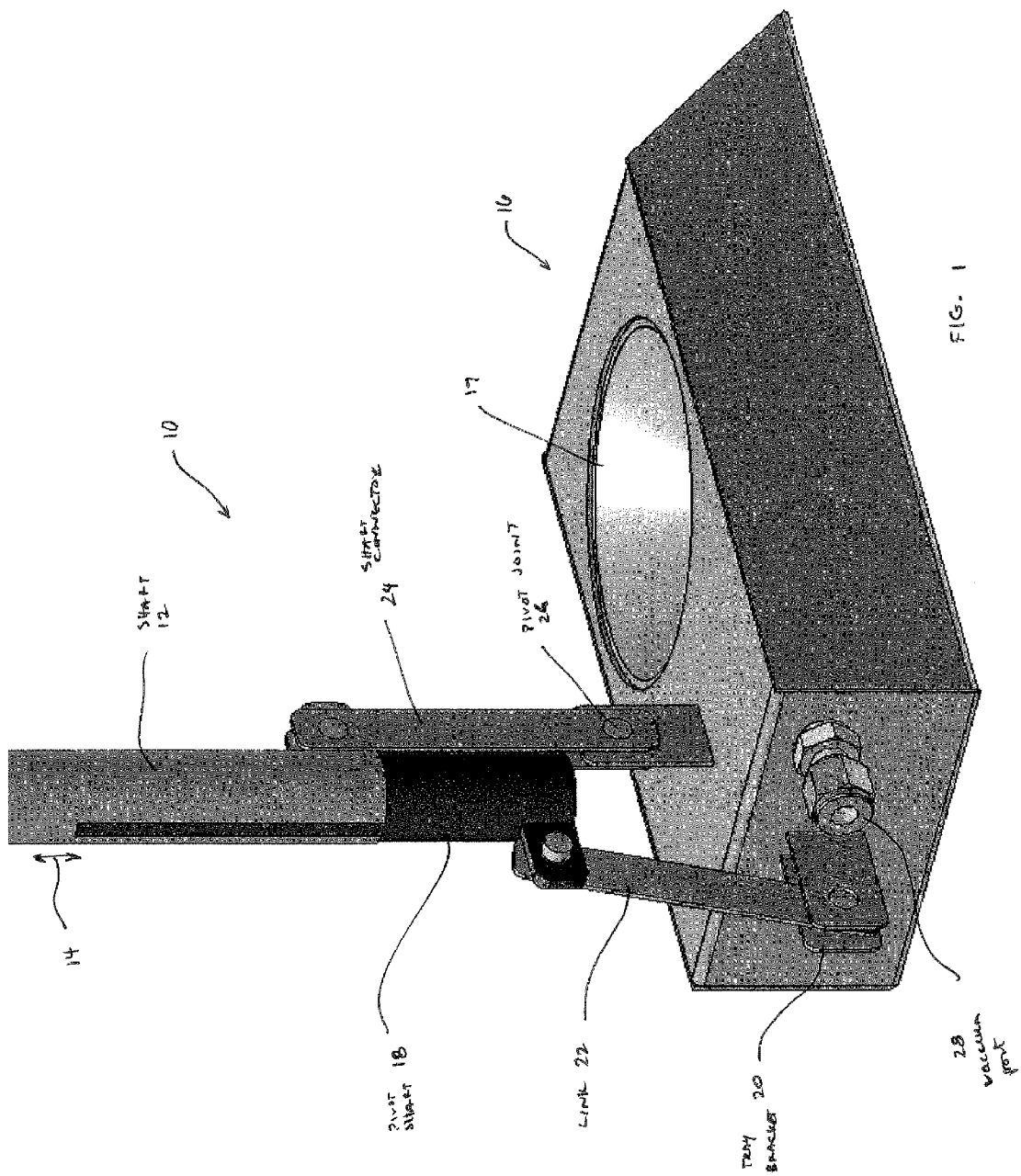
FIG. 1 is a rear perspective view of the debris trap described herein.

With reference to the drawings, a debris trap 10 serves to catch debris falling through a fuel bundle orifice in a nuclear reactor. The debris trap 10 includes a shaft 12 having a pivot actuator 14 (shown schematically via arrows in FIG. 1) at one end thereof. A debris capture tray 16 is pivotally attached to an opposite end of the shaft 12. A pivot mechanism (described below) connected between the debris capture tray 16 and the shaft 12 is actuated by the pivot actuator 14 to pivot the debris capture tray 16 via the pivot mechanism between an insertion position (shown in FIG. 3) and a capture position (shown in FIGS. 1 and 2).

The debris capture tray 16 includes a tray cavity 17 that is sized larger than the fuel bundle orifice. Preferably, the tray cavity 17 is conical to reduce the possibility of debris exiting the tray 16.

A length of the shaft 12 is preferably sufficient to extend from a refueling bridge of the nuclear reactor to a bottom of the fuel bundle. Of course, the length of the shaft 12 may vary depending on desired use, size of the reactor, etc.

Figure 3:
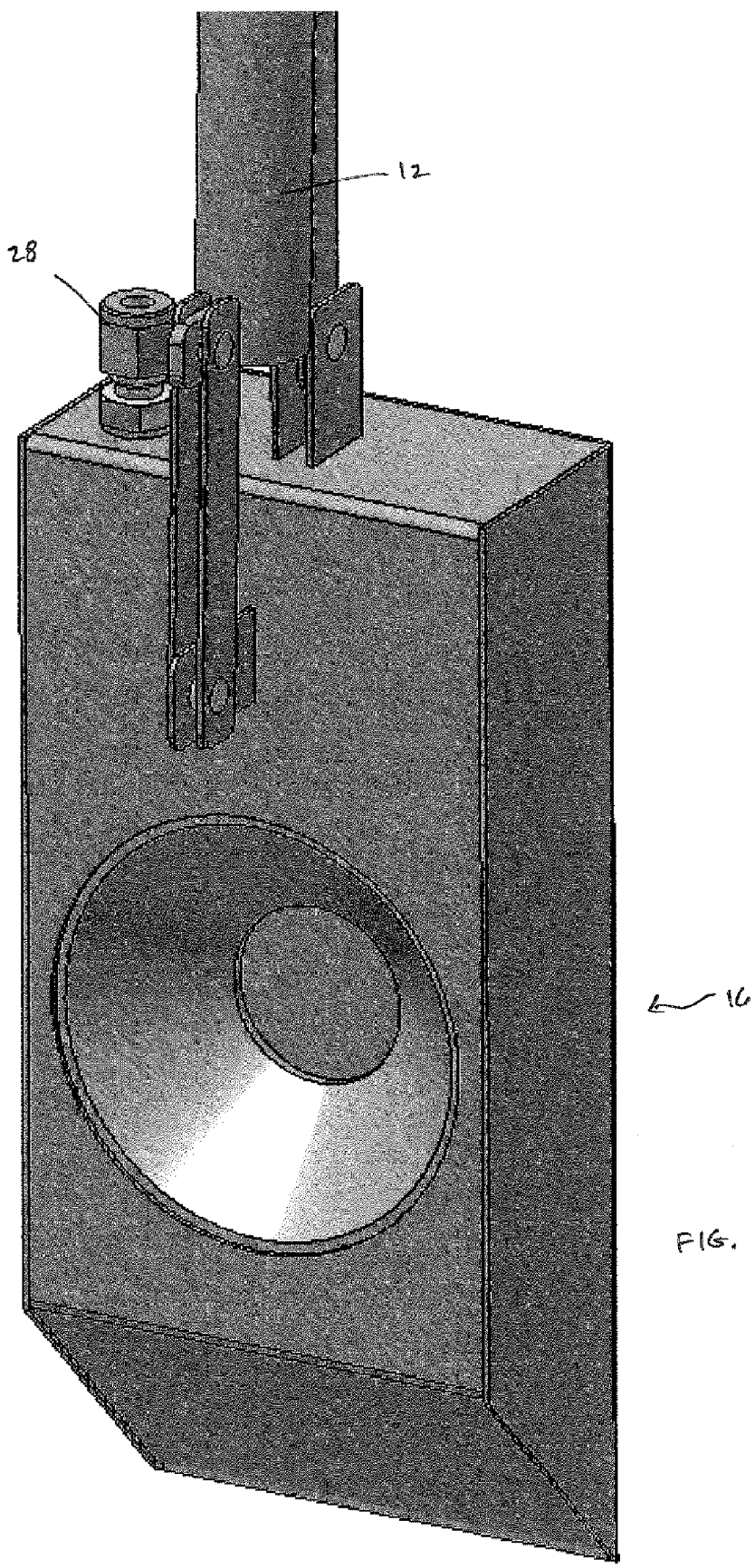
FIG. 3 shows the debris trap in its insertion position.

A pivot shaft 18 is slidably coupled with the shaft 12 and is connected to the pivot actuator 14. The pivot mechanism may be any number of mechanical arrangements that enable the debris capture tray 16 to pivot between the insertion position and the capture position. As shown, the pivot mechanism includes a tray bracket 20 secured to the debris capture tray 16 and a link 22 connected between the tray bracket 20 and the pivot shaft 18. A shaft connector 24 may be connected between the shaft 12 and the debris capture tray 16. The shaft connector 24 is pivotally connected to the debris capture tray 16 via a pivot joint 26, where relative movement of the pivot shaft 18 to the shaft 12 causes the debris capture tray 16 to pivot between the insertion position and the capture position. As shown in FIG. 3, in the insertion position, the debris capture tray 16 may be oriented substantially in alignment with the shaft 12.

The pivot actuator 14 may be of any suitable construction to effect relative positioning of the pivot shaft 18 to the shaft 12. The actuator 14 may include a manual actuator or an automated actuator such as a pneumatic actuator or the like.

The debris capture tray 16 preferably also includes a vacuum port 28 that is attachable to a vacuum source. If included, the vacuum system serves to remove the debris from the tray while also pulling additional debris from the bundle.

Figure 2:
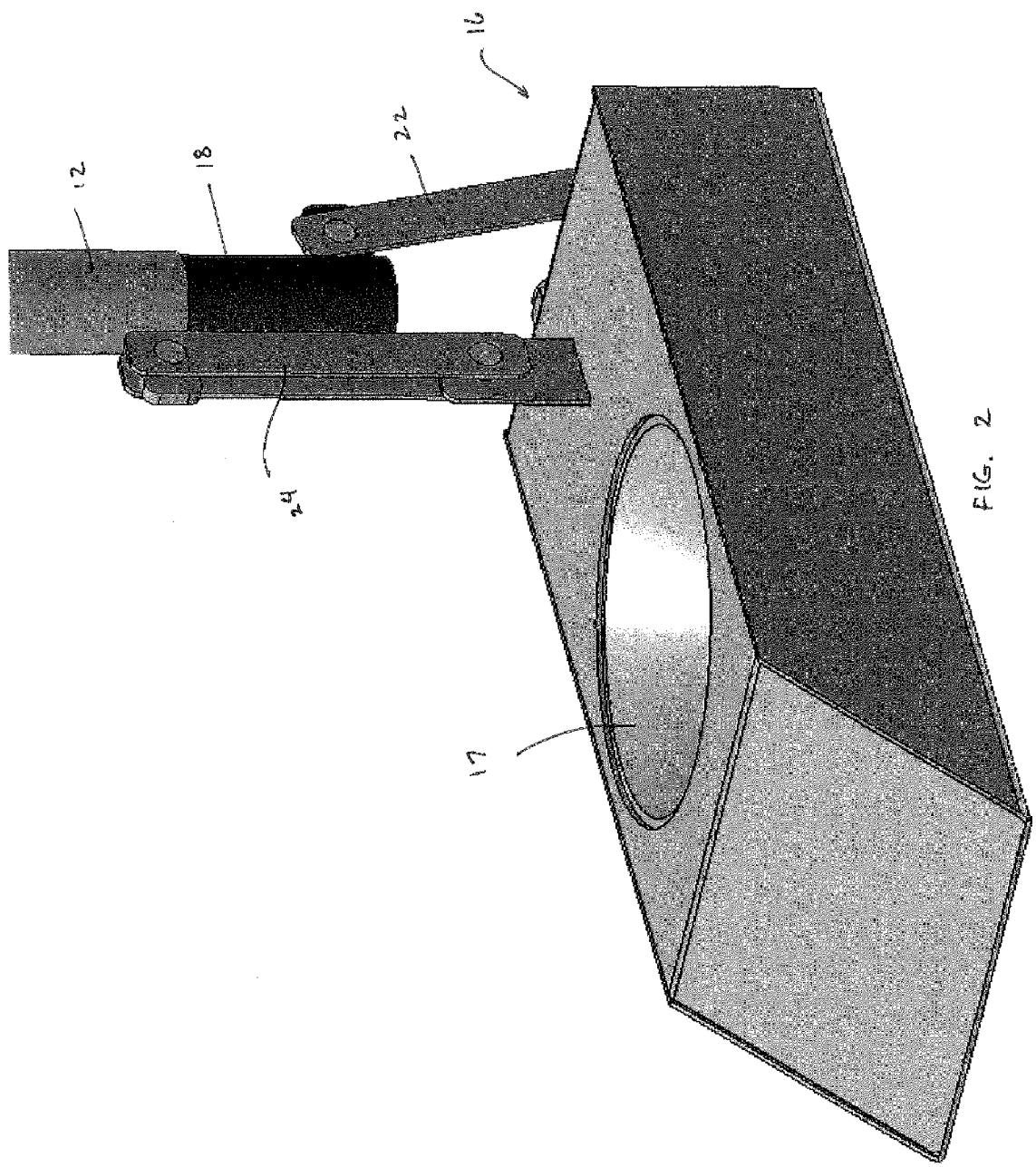
FIG. 2 is a front perspective view of the debris trap.

In order to insert the debris trap 10 under a fuel bundle of a nuclear reactor, with the debris capture tray 16 in the insertion position (FIG. 3), the debris trap 10 is lowered to a position adjacent a bottom of the fuel bundle. The debris trap may be lowered from the refueling bridge in the reactor. Once the fuel bundle is lifted by the mast, the debris capture tray 16 is pivoted to the capture position (FIGS. 1 and 2). The debris capture tray 16 is then positioned under the fuel bundle, completely covering the orifice in the bottom of the bundle so that any debris falling through the orifice will fall in the cavity 17 of the debris capture tray 16. Preferably, the debris trap 10 remains in place until the mast is at the new bundle location.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A debris trap for catching debris falling through a fuel bundle orifice in a nuclear reactor, the debris trap comprising:
    a shaft including a pivot actuator at one end thereof;
    a debris capture tray pivotally attached to an opposite end of the shaft;
    a pivot shaft coupled to the pivot actuator and the debris capture tray and displaceable by the pivot actuator relative to the shaft; and
    a pivot mechanism connected between the pivot shaft and the debris capture tray, the pivot mechanism being actuated by the pivot actuator,
    wherein the debris capture tray includes a tray cavity, wherein the pivot actuator is operable to displace the pivot shaft relative to the shaft to pivot the debris capture tray about a pivot joint between an insertion position and a capture position, wherein in the insertion position, a lengthwise axis of the debris capture tray is substantially in alignment with the shaft, and wherein in the insertion position, the debris capture tray in its entirety extends beyond the pivot joint in substantial alignment with the shaft.

2. A debris trap according to claim 1, wherein a length of the shaft is sufficient to extend from a refueling bridge of a nuclear reactor to a bottom of the fuel bundle.

3. A debris trap according to claim 1, wherein the tray cavity of the debris capture tray is conical.

4. A debris trap for catching debris falling through a fuel bundle orifice in a nuclear reactor, the debris trap comprising:
   a shaft including a pivot actuator at one end thereof;
   a debris capture tray pivotally attached to an opposite end of the shaft;
   a pivot mechanism connected between the debris capture tray and the shaft, the pivot mechanism being actuated by the pivot actuator;
   a pivot shaft slidably coupled with the shaft and connected to the pivot actuator, wherein the pivot mechanism comprises a tray bracket secured to the debris capture tray, and a link connected between the tray bracket and the pivot shaft,
   wherein the debris capture tray includes a tray cavity, and wherein the pivot actuator is operable to pivot the debris capture tray between an insertion position and a capture position; and
   a shaft connector connected between the shaft and the debris capture tray, the shaft connector being pivotally connected to the debris capture tray via a pivot joint,
   wherein relative movement of the pivot shaft to the shaft causes the debris capture tray to pivot between the insertion position and the capture position, wherein in the insertion position, a lengthwise axis of the debris capture tray is oriented substantially in alignment with the shaft, and wherein in the insertion position, the debris capture tray in its entirety extends beyond the pivot joint in substantial alignment with the shaft.

5. A debris trap according to claim 1, further comprising a vacuum port in the debris capture tray and attachable to a vacuum source.

6. A debris trap for catching debris falling through a fuel bundle orifice in a nuclear reactor, the debris trap comprising:
   a shaft;
   a debris capture tray attached to the shaft, wherein the debris capture tray includes a conical tray cavity;
   a pivot actuator at one end of the shaft, wherein the debris capture tray is pivotally attached to an opposite end of the shaft about a pivot joint;
   a pivot mechanism connected between the debris capture tray and the shaft, the pivot mechanism being actuated by the pivot actuator, wherein the pivot actuator is operable to pivot the debris capture tray via the pivot mechanism between an insertion position and a capture position; and
   a vacuum port in the debris capture tray and attachable to a vacuum source,
   wherein in the insertion position, a lengthwise axis of the debris capture tray is substantially in alignment with the shaft, and wherein in the insertion position, the debris capture tray in its entirety extends beyond the pivot joint in substantial alignment with the shaft.

* * * * *